(12) United States Patent
Culbert

(10) Patent No.: US 7,512,781 B2
(45) Date of Patent: *Mar. 31, 2009

(54) FIREWALL WITH STATEFUL INSPECTION

(75) Inventor: Patrick Culbert, Crows Nest (AU)

(73) Assignee: Firebridge Systems Pty Ltd., New South Wales (AU)

( * ) Notice: Subject to any disclaimer, the term of this patent is extended or adjusted under 35 U.S.C. 154(b) by 616 days.

This patent is subject to a terminal disclaimer.

(21) Appl. No.: 10/512,950

(22) PCT Filed: May 1, 2003

(86) PCT No.: PCT/AU03/00527

§ 371 (c)(1),
(2), (4) Date: Jun. 13, 2005

(87) PCT Pub. No.: WO03/094464

PCT Pub. Date: Nov. 13, 2003

(65) Prior Publication Data

US 2006/0085849 A1    Apr. 20, 2006

(30) Foreign Application Priority Data

May 1, 2002    (AU) .................................. PS2148

(51) Int. Cl.
H04L 9/00    (2006.01)
(52) U.S. Cl. .......................... 713/153; 726/13
(58) Field of Classification Search .................. None
See application file for complete search history.

(56) References Cited

U.S. PATENT DOCUMENTS 5,884,025 A * 3/1999 Baehr et al. .................... 726/13
6,496,935 B1 * 12/2002 Fink et al. ...................... 726/13

FOREIGN PATENT DOCUMENTS

| EP | 743777 A2 | 11/1996 |
| WO | WO 00/02114 A2 | 1/2000 |
| WO | WO/00/52575 A1 | 9/2000 |
| WO | WO 01/06726 A2 | 1/2001 |

* cited by examiner

Primary Examiner—Pramila Parthasarathy
(74) Attorney, Agent, or Firm—Pearne & Gordon LLP

(57) ABSTRACT

A network security device for controlling the flow of packets into and out of an internal network, includes first and second network cards and a stateful inspection firewall. The first network card forwards each packet for inspection to determine whether or not the packet is part of an existing session. If the packet is part of an existing session it will be forwarded to the second network card and on to the internal network. If the packet is not part of an existing session it will be compared with a set of rules to determine whether the packet is acceptable or not acceptable to the network. If the packet is acceptable, it will be forwarded to the second network card and to the internal network and the session is entered into the stateful inspection table, and if the packet is not acceptable it will be dropped and will disappear. During the outflow of packets an outbound packet passes through the second network card where it is inspected to determine whether or not it is part of an existing session and, if so, it is forwarded to the first network card to exit the device, and, if not, it is compared with the set of rules and if the packet is acceptable it is forwarded to the first network card to exit the device and, if not, it is dropped and disappears.

14 Claims, 4 Drawing Sheets

FIREWALL WITH STATEFUL INSPECTION

TECHNICAL FIELD

The invention relates to a network security device and more particularly to a stateful inspection firewalling bridge.

BACKGROUND ART

Many network services have been proven exploitable and tools to do so, even for the beginner, have become widely available. Even without compromising information, the temporary blackout of a server or network can mean many hours of lost work and missed business opportunities.

Companies can connect to the Internet, and can exchange data via dialup; isdn and leased lines. Furthermore, employees can be offered remote access options. Moreover, every incoming connection is likely to have outgoing connections as well.

No computer network is completely secure. Like any lock, if it is human built, it can be human broken. A small security measure may take out most amateurs that otherwise would cause an annoyance. On the other hand, a major site should not settle for small security measures.

Security is expensive. Dedicated hardware and software has to be purchased, installed, configured and maintained by either hiring, employing or creating expertise. Often changes have to be made to existing infrastructure requiring more hardware or causing downtime.

GLOSSARY OF TERMS

Bridge

A device which forwards traffic between network segments based on data link layer information. These segments would have a common network layer address.

Firewall

A dedicated gateway machine with special security precautions on it, used to service outside network, especially Internet connections and dial-in lines. The idea is to protect a cluster of more loosely administered machines hidden behind it from crackers. The typical firewall is an inexpensive microprocessor-based unit machine with no critical data, with modems and public network ports on it, but just one carefully watched connection back to the rest of the cluster.

Router

A device which forwards packets between networks. The forwarding decision is based on network layer information and routing tables, often constructed by routing protocols.

Packets

The unit of data sent across a network. "Packet" is a generic term used to describe a unit of data at any layer of OSI protocol stack, but it is most correctly used to describe application later data units ("application protocol data unit", APDU).

Stateful Inspection

A stateful inspection program reviews all packets initiating a connection against a firewall rulebase in sequential order. If the packet goes through any rule without being accepted, the packet is denied. If the connection is accepted, the session is then entered into the firewall's stateful inspection table. If the session is in the table, and the packet is a part of that session, then the packet is accepted. If the packet is not part of the session, then it is dropped. Every packet is compared against the rulebase and based on the matching rule a decision is executed.

Rule Base

A set of rules which determines which packets are allowed or disallowed through a network.

HTML: Hypertext Markup Language

This is the language used to describe WWW pages.

A tag-based ASCII language that is used to specify the content and hypertext links to other documents on World Wide Web servers on the Internet. Browsers made for any operating system, (hardware platform, monitor resolution, etc.) can then be used to view the prepared documents and follow links to display other documents.

Network Interface Card (Network Card)

A name for the LAN Adaptor (printer circuit board) installed in a PC, that enables it to communicate over a LAN. The term is used commonly by IBM PC and token ring users.

IP Address

All network-layer protocols have an address format, and for the 32-bit IP addresses of the TCP/IP protocol, addresses are of the form "199.12.1.1". This is called dotted decimal, and each of the four sections is a decimal number from 0 to 255, representing 8 bits of the IP address specifies a specific host on that network.

Since there are only 32 bits to the entire IP address and some networks have many more hosts than others (and there are fewer larger networks), there are different address classes. These allocate different numbers of bits to the network and host portion of the address.

DMZ De-Militarised Zone

From the military term for an area between two opponents where fighting is prevented.

DMZ Ethernets connect networks and computers controlled by different bodies. They may be external or internal. External DMZ Ethernets link regional networks with routers to internal networks. Internal DMZ Ethernets link local nodes with routers to the regional networks.

Current Technology

Many different types of firewalls and security software are known. They can be broken down to three categories. (We do not consider personal firewalls protecting a single home computer).

Proxy based: The firewall serves as an application-proxy between systems that physically connect to different network interfaces on the firewall server. An application-proxy acts as an agent or substitute at the application level for entities that reside on one side of the firewall when dealing with entities on another side of the firewall. By maintaining this separation between interfaces, and continuously protocol checking, provides a very secure environment. This is demanding on CPU time and this can become an issue in high volume sites.

Stateful inspection: Whenever the firewall receives a packet initiating a connection, that packet is reviewed against the firewall rulebase in sequential order. If the packet goes through any rule without being accepted, the packet is denied. If the connection is accepted, the session is then entered into the Firewall's stateful connection table, which is located in memory. Every packet that follows is then compared to the stateful inspection table. If the session is in the table, and the packet is part of that session, then the packet is accepted. If the packet is not part of the session then it is dropped. This improves system performance, as every single packet is not compared against the rule base.

Packet filters: Every packet is compared against the rulebase and based on the matching rule or rules a decision is executed.

Most of the high-end firewalls provide combinations or hybrids of the above-mentioned techniques. All known examples have in common, that they are technically routers and need to have different subnets on each network interface.

Router vs. Bridge

A router is a device that forwards packets between networks. The router is aware of different networks and how to get there. This is the technique currently used by all known commercial firewalls. This implies that hosts on a different side of the firewall have to have a different network address, as the traffic will otherwise never end up at the firewall. Network changes needed on the dial-in device as well as on the LAN.

A bridge is a device that forwards traffic between network segments based on data link layer information. It works based on the MAC address.

The present invention emerged from a real life situation where a company wanted to protect their dial-in server. That server already provided network connectivity for employees and third parties. A new third party company needed access, but it was known that that company had an insecure Internet connection.

Implementing any sort of conventional firewall would have meant reconfiguring the addressing-scheme of the dial-in server and coordinating changes with the remote companies.

Accordingly the need exists for a security device which requires no changes to existing infrastructure.

Also required is a fully transparent firewall. The systems of the present invention will never show in traceroute, as it is not a logical part of the network. Further, the invention may be implemented without assigning an IP address to it. This means console access for configuration but results in a security device without an address.

DISCLOSURE OF THE INVENTION

A network security device for controlling the flow of packets into and out of an internal network, said device including first and second network cards and a stateful inspection firewall and wherein during inflow of packets the first network card forwards each packet to the firewall for inspection to determine whether or not the packet is part of an existing session and wherein:
  (i) if the packet is part of an existing session it will be forwarded to the second network card and on to the internal network, and
  (ii) if the packet is not part of an existing session it will be compared with a set of rules which determine whether the packet is acceptable or not acceptable to the network and wherein:
    (a) if the packet is acceptable it will be forwarded to the second network card and to the internal network, and the session is entered into the stateful inspection table,
    (b) if the packet is not acceptable it will be dropped and will disappear,
and wherein during the outflow of packets an outbound packet passes through the second network card where it is inspected to determine whether or not it is part of an existing session and, if so, it is forwarded to the first network card to exit the device, and, if not, it is compared with the set of rules and if the packet is acceptable it is forwarded to the first network card to exit the device and, if not, it is dropped and disappears.

MODES FOR CARRYING OUT-THE INVENTION

Implementation of the invention requires, for example:

Hardware
Minimum 200 Mhz Processor
Min 64 MB RAM
One solid-state hard drive of 64 MB Capacity
3 x Network Cards 10/100/1000
Case with power supply and LCD panel with input device for system configuration.
Serial port for debugging and startup information as we do not use a video card.

Software
Linux Kernel Version 2.4.x
Apache Web Server 1.3.22 mod_perl mod_SSL
Perl Version 5.6.1
OpenSSH+OpenSSL
GNU Tools and utilities needed for running SYS V Linux OS
Web Interface using mod_perl, HTML and CSS Installation is accomplished by creating a computer using the hardware listed in the "Hardware" section above. The invention includes a configuration interface, which include firewall configuration and system monitoring.

Figure 1:
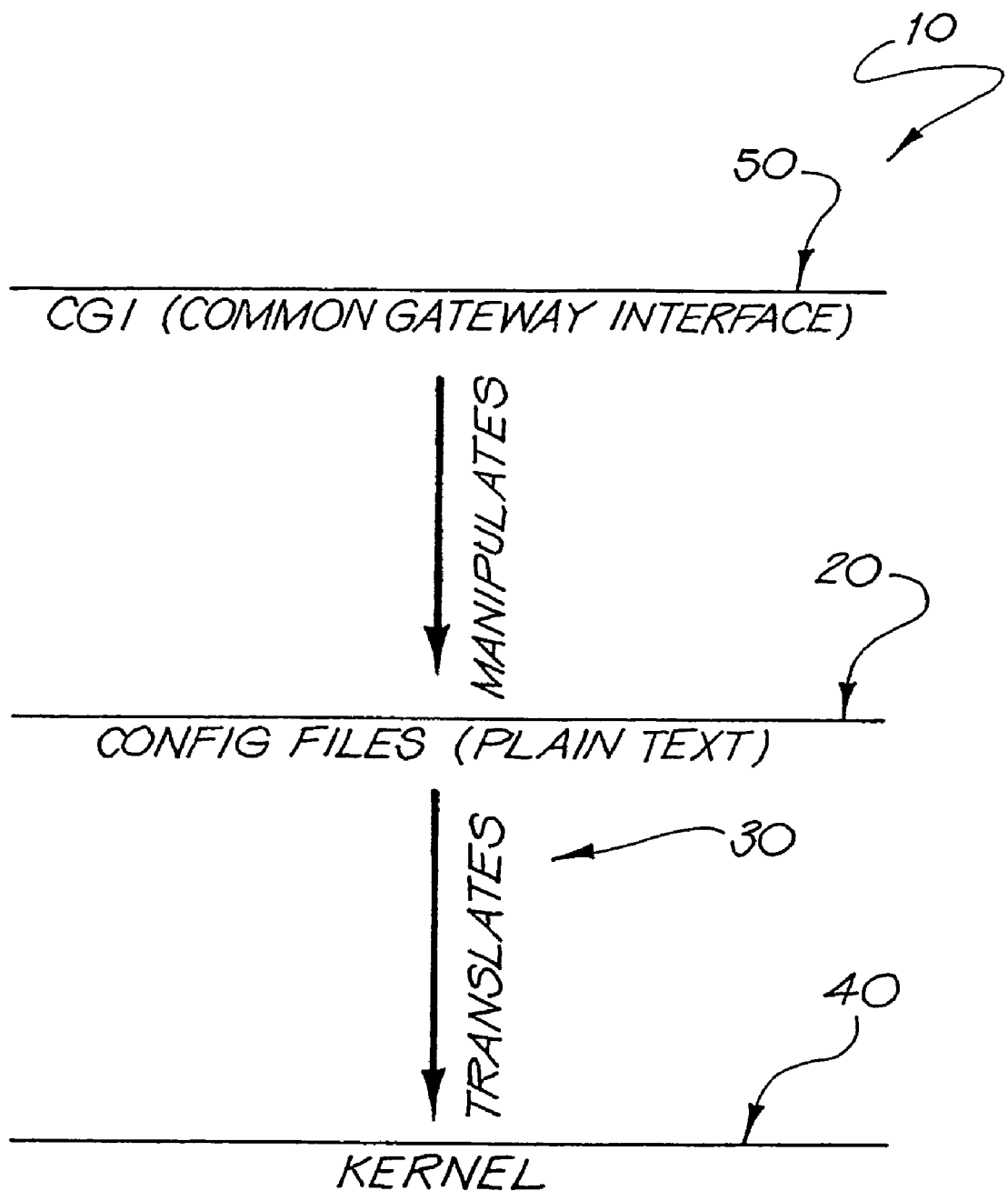
FIG. 1 is a flow chart illustrating how the system of the present invention is configured.

The Firewall Configuration is shown in flow chart form in FIG. 1. The interface 10 uses plain text configuration files (20), manipulated through a Common Gateway Inferface (50), that contain the ruleset. The configuration files 20 are manipulated by Perl scripts that are accessed through an HTML interface and then translated (30) into the kernel rules 40 by Perl scripts.

Preferred management interface and firewall configuration files are described below.

The System Monitors:—
  (i) LOAD status which tells the users the current load on the CPU,
  (ii) DISK SPACE status which tells the users the current level of Disk Space usage, and
  (iii) CONFIGURATION status, which tells the users whether or not the changes they have made to the configuration of the firewall have been committed to the firewall.

The system also monitors and logs whether or not packets have been allowed or denied.

Figure 2:
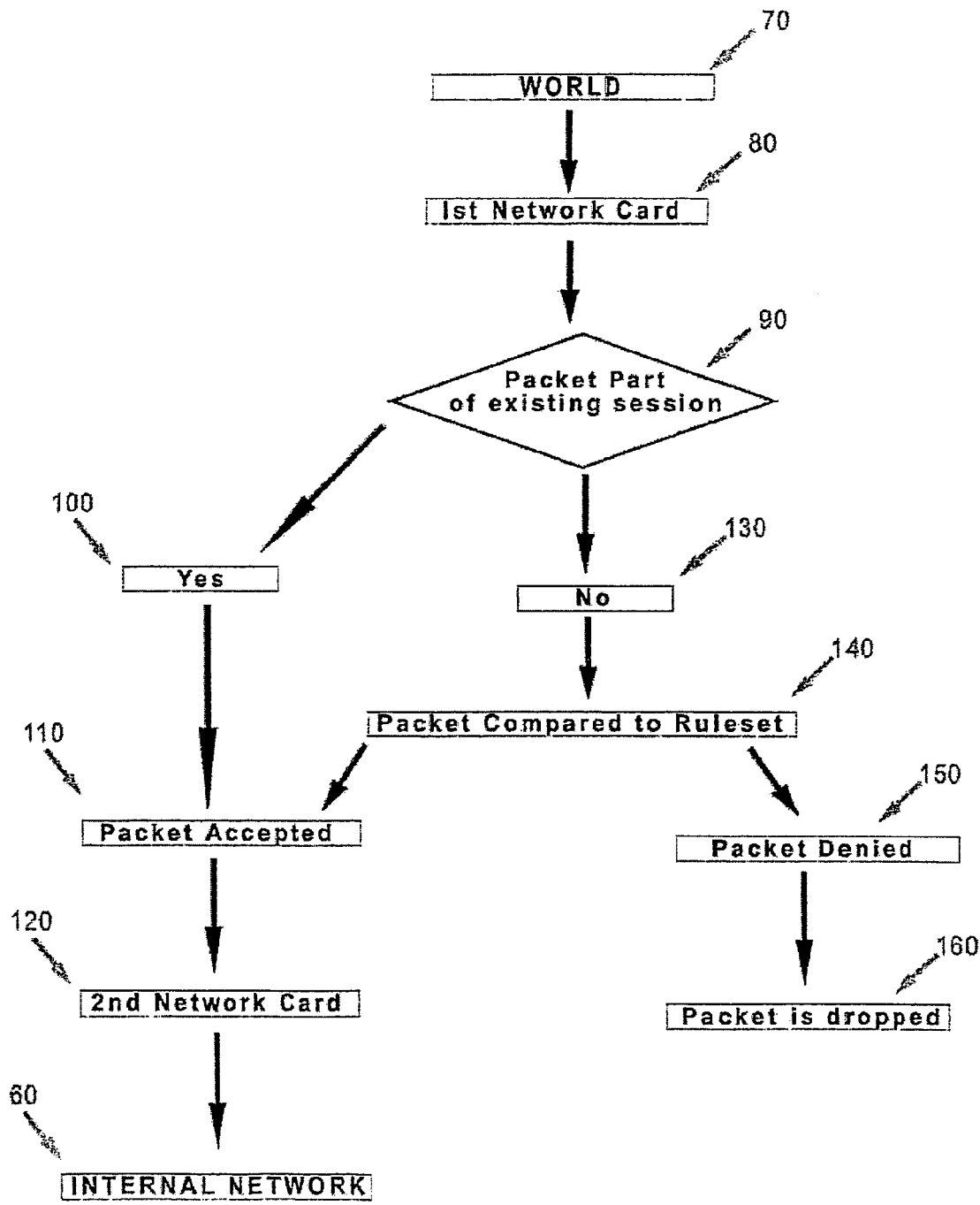
FIG. 2 is a flow chart illustrating how network traffic enters an internal network through the system of the present invention.

As shown in FIG. 2, the inward flow of information comprises a flow of packets from the world 70. Each packet passes through the first network card 80. The packet is then inspected (90) to see if it is part of an existing session. If the packet is part of an existing session (100) the packet will be accepted (110) and then forwarded to the second network card 120 and through to the internal network 60.

If the packet is not part of an existing session (130) it will be compared with the set of rules. If the packet is accepted (110) it will be then forwarded to the second network card 120 and through to the internal network 60. This session will then be entered into a Stateful Inspection Table and any packet that is part of this session will be then forwarded to the second network card 120 and through to the network 60. If the packet is denied (150) or is not part of that session it will then be dropped (160) which means that it disappears. A log can record what happened to the packet.

Figure 3:
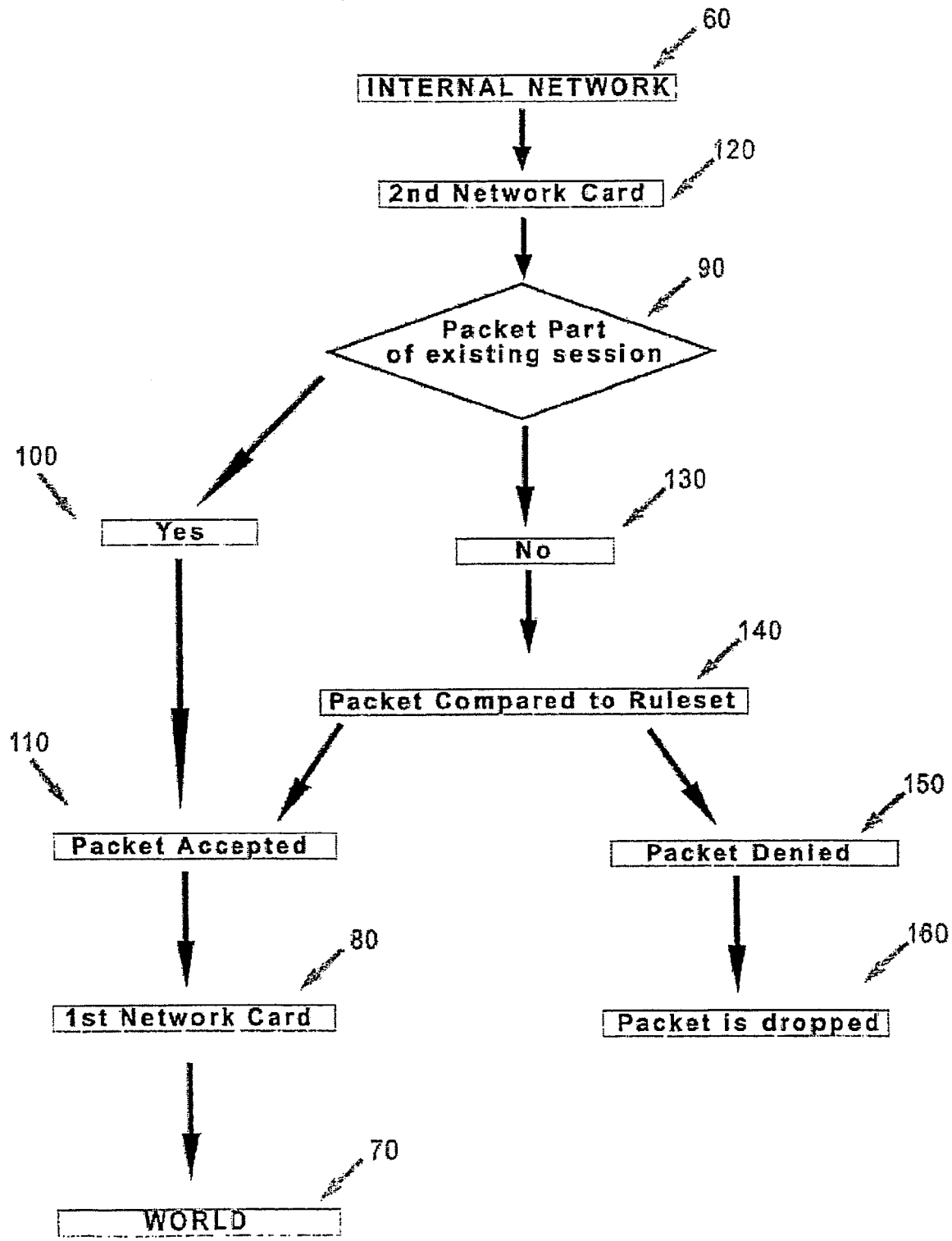
FIG. 3 is a flow chart illustrating how internal network traffic passes through the system of the present invention into the external world.

As shown in FIG. 3, an outbound packet from the network 60 passes through the second network card 120. The packet is then inspected to see if it is part of an existing session (90). If the packet is part of an existing session (100) the packet will be accepted (110) and then forwarded to the first network card 80 and through to the world 70.

If the packet is not part of an existing session, the packet will then be compared to the ruleset. If the packet is accepted (110) it will be then forwarded to the first network card 80 and through to the world 70. This session will then be entered into the Stateful Inspection Table and any packet that is part of this session will be then forwarded to the first network card 80 and through to the world 70. If the packet is denied (150) it will then be dropped (160) which means that it disappears. The log can record what happened to the packet.

The following table compares the features of the present invention to two other commercial products.

| Present Invention | FireBox II ™ | Firewall I ™ & Raptor ™ |
|---|---|---|
| 1. All-in-One Network Security Device that requires no other devices to protect a network or segment of a network | All-in-One Network Security Device that requires no other devices to protect a network or segment of a network | Software Based Network Security Device Require: Extra Hardware (a computer) & Extra Software (an operating system) |
| 2. HTML Interface for Configuration which means that it can be configured from any computer that has a browser without installing any additional software | HTML Interface for Configuration which means that it can be configured from any computer that has a browser without installing any additional software | Uses its own Interface for configuration which means that it can only be configured from a computer that has the software installed on it. |
| 3. Uses 3 Network Cards- Management Interface with dummy internal IP address No IP Address No IP Address | Uses 3 Network Cards DMZ Local Internet | Uses at least 2 Network Cards. Can uses as many as supported by hardware and OS combination. Internal External |
| 4. Requires No IP Addresses on the protected segments | Requires Multiple Relevant IP Addresses | Requires Multiple Relevant IP Addresses |
| 5. Uses Stateful Inspection Firewall Technology | Uses Packet Filtering Firewall Technology | Uses Stateful inspection and proxy Firewall Technology |
| 6. Checks Packet and then Bridges it (Completely Transparent) | Checks Packet and then Routes it | Checks Packet and then Routes it |

Firewall I and Raptor require a separate computer with an operating system before they can run and is therefore very different to the other two firewalls.

The present invention uses 3 Network Cards. The first two network cards 80, 110 do not have an IP address assigned to them. The third network card is a management interface with dummy internal IP address which is only used to configure the firewall. It is not used in the operation of the firewall in any way and has no IP address.

This is the greatest difference between the invention and any known Firewall on the market. Because the present inventive solution does not use IP addresses, it is not a logical part of the network. This means that it cannot be detected and that it can be implemented simply by disconnecting an existing interface and plugging this in the middle. No other network reconfiguration is required. This makes it completely unique.

The Firebox™ uses 3 Network Cards and requires 3 relevant IP addresses. This means that the Network needs to be reconfigured to allow for the installation of this product.

Firewall I™ and Raptor™ use 2 Network Cards and require 2 relevant IP addresses. This means that the Network needs to be reconfigured to allow installation of these products.

The present invention checks a packet and then bridges it, which is completely transparent. The Firebox™ checks a packet and then routes it. Firewall I™ and Raptor™ check the packet and then route it. Raptor™ checks the requests and then proxies it.

All three firewalls check a packet. One significant difference is that the present invention will bridge it rather than route it.

Figure 4:
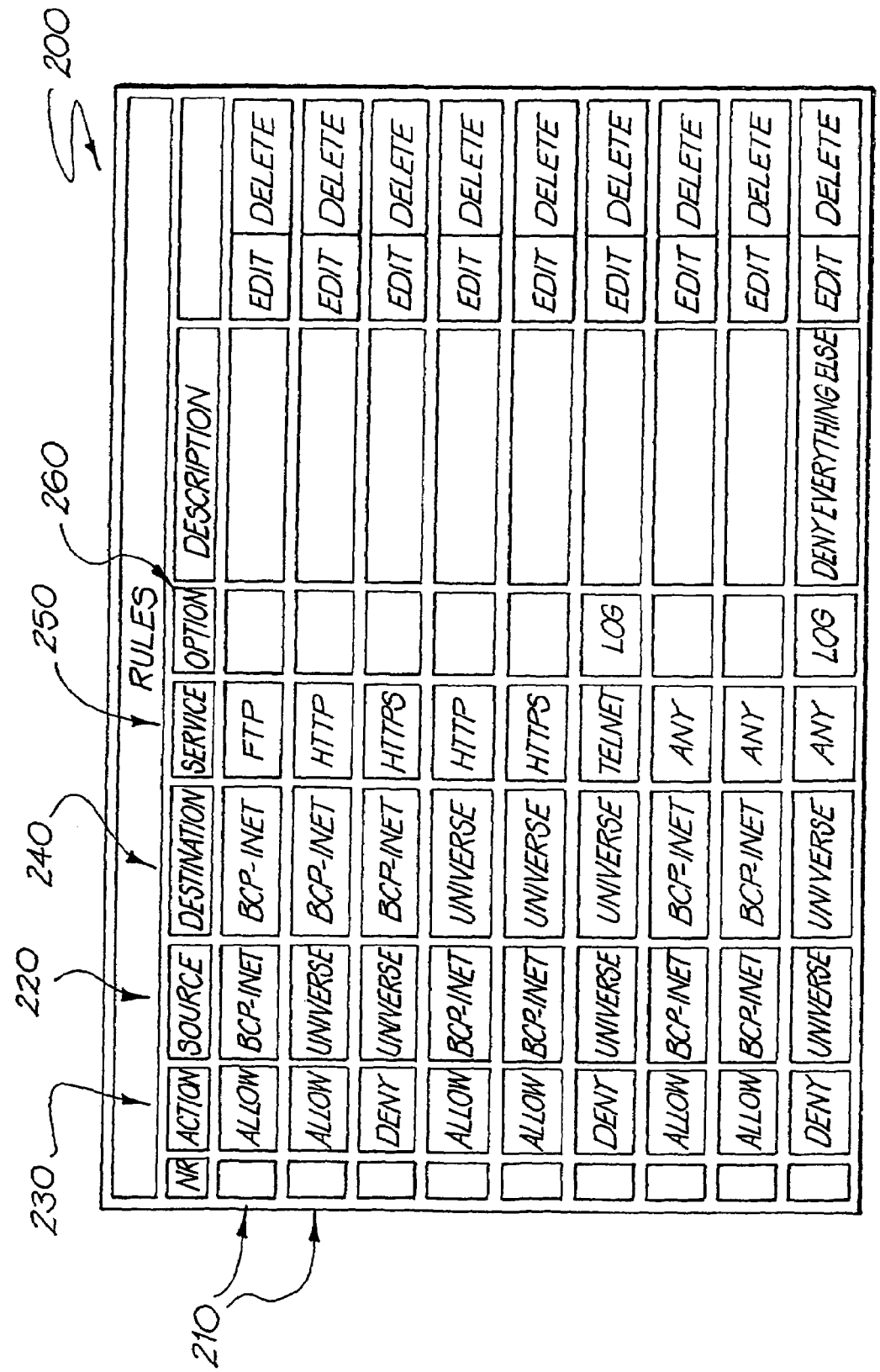
FIG. 4 is an illustration of the graphical user interface which provides a user with editorial control over a packet filtering rule set.

As shown in FIG. 4, a rule set 90 can be edited through a graphical user interface 200. All rules 210 are given an order. This order may be modified at any time. The rules 210 are checked by the computer, one at a time, in order. If a packet satisfies a rule 210 it will be actioned 230 as determined by the rule, otherwise it will go to a default rule. The rule set takes into account the packet source 220, the destination 240, the relevant service 250 and options 260 such as logging requirements. Graphical buttons provide 270, 280 easy user editing or deletion.

The preferred management interface and firewall configuration files will now be described.

The CGI interface uses mod_perl and distinguishes between two types of files. *.cgi files which deal with what the user sees in the webbrowser. *-lib.pl files which contain functions for checking user input and manipulating the configuration files. There are static html files, images and cascading stylesheets used as a framework for the dynamic content and presentation.

The following files are used to manipulate the configuration files:

```
/
- fb-cgilib.pl           (general functions used by all scripts)
- ipcalc-lib.pl (ip calculator library)
- ipcalc.cgi             (ip calculator presentation)
* bridgeview             (this contains the read only versions)
   - vwgroups.cgi
   - vwnetobjects.cgi
   - vwrules.cgi
   - vwservices.cgi
* fw
   - fwconf-lib.pl (write ipchains compatible config based
     on rules)
   - fwconf.cgi          (activate/roll back configuration)
   - groups-lib.pl       (manipulate group file)
   - groups.cgi          (presentation for group file)
   - netobjects-lib.pl   (manipulate network objects file)
   - netobjects.cgi      (presentation for network objects file)
   - rules-lib.pl        (manipulate rules file)
```

-continued

| | |
|---|---|
| - rules.cgi | (presentation for rules file) |
| - services-lib.pl | (manipulate services file) |
| - services.cgi | (presentation for services file) |
| * logvw | |
| - logvw.cgi | (view current log file) |
| * options | |
| - fbgconf-lib.pl | (manipulate global configuration options) |
| - fbgconf.cgi | (presentation global configuration options) |
| * status | |
| - confstatus.cgi | (check if current configuration is identical to active) |
| - loadstatus.cgi | (check the load of the box) |
| * wizard | |
| - wizard.cgi | (step by step creation of rules and related objects) |

Firebridge uses the following configuration files:

| | |
|---|---|
| Actions | (Possible actions for a rule) |
| nr:action | |
| fbgcfg | (Global configuration options) |
| option=value | (true or false) |
| fbrules | (rules by number) |
| nr:allow/deny:source-name:destination-name: service-name:action-nr:comment (note that source/destination/service can be a group name) | |
| groups | (groups) |
| name:type:member-name,member-name,member-name:comment | |
| netobjects | (network entities) |
| name:address/mask | |
| protocols | (ip protocols by number) |
| nr:name:comment | |
| name:description:protocol-nr:source-port:destination-port (ports can be ranges separated by a dash, e.g: 1024-65535) | |

The Firebridge uses the following directories for it's configuration:
/usr/local/firebridge/fwconfig/active
/usr/local/firebridge/fwconfig/config Upon boot the system will write the files from ./active to ./config which physically lives on the /var ram drive (symbolic link to the above name). When a user makes changes to the firewall these will be recorded in the ./config directory. Once the user is happy with all the changes he then selects activate config within the management interface.

The system then takes all the files from the ./config and overwrites the files in ./active. It then starts creating ipchains compatible output translating groups into multiple rules as desired. When all rules were written successfully it activates these in ipchains.

Alternatively the user can select roll back upon which the system will take the files from ./active and overwrite the files in ./config.

The invention claimed is:

1. A stateful inspection bridging network security device for controlling the flow of packets into and out of an internal network, via a data link layer said device including:
   a first network card connected to an external network;
   a second network card connected to the internal network;
   a third network card which is a management interface having a private, not publicly routed IP address which is used to configure a stateful inspection firewall; and
   the stateful inspection firewall connected to said first network card and said second network card, wherein during inflow of packets from the external network to the internal network, the first network card forwards each packet to the firewall for inspection to determine whether or not the packet is part of an existing session by examining a stateful inspection table stored in the firewall, and wherein:
   (i) if the packet is part of an existing session the packet is forwarded via the data link layer to the second network card where the packet is forwarded on to the internal network, and
   (ii) If the packet is not part of an existing session the packet is compared with a set of rules which determine whether the packet is acceptable or not acceptable to the network and wherein:
      (a) if the packet is acceptable the packet is forwarded via the data link layer to the second network card where the packet is forwarded to the internal network, and the session is entered into the stateful inspection table,
      (b) if the packet is not acceptable the packet will be dropped and will disappear,
   and wherein during the outflow of packets from the internal network to the external network, an outbound packet passes through the second network card to the firewall where the outbound packet is inspected to determine whether or not the outbound packet is part of an existing session and, if so, the outbound packet is forwarded to the first network card to exit the device to the external network, and, if not, the outbound packet is compared with the set of rules and if acceptable the outbound packet is forwarded via the data link layer to the first network card to exit the device to the external network and, if not acceptable, the outbound packet is dropped and disappears.

2. A device according to claim 1 wherein the first and second network cards do not have publicly routed IP addresses.

3. The device of claim 1 wherein the device is adapted to be located between a router and a hub or server machine.

4. The device of claim 1 wherein the device does not require a separate computer to implement.

5. The device of claim 1 wherein the device is configurable from an HTML interface.

6. The device of claim 1 wherein the device is configured with an HTML interface which is supplied with the device.

7. The device of claim 1 further comprising a LOAD monitor which provides LOAD status, and for providing a graphic notification to a user of what the current load on the CPU is.

8. The device of claim 1 further comprising a CONFIGURATION status monitor, which provides for a graphic notification to a user of whether or not the changes they have made to the configuration of the firewall have been committed to the firewall.

9. The device of claim 1 further comprising a monitor and log which provides for a graphic indication of whether or not packets have been allowed or denied.

10. The device of claim 1 further comprising: an HTML interface for configuration such that it can be configured from any computer to which it is networked that has an HTML browser without installing any additional software.

11. The device of claim 1 wherein: the first and second network cards do not have or require an IP address assigned to them.

12. The device of claim 1, wherein the first network card forwards each packet to the firewall without use of said third network card, and further wherein the outbound packet passes through the second network card to the firewall without use of said third network card.

13. A network bridge comprising:
a first network card connected to an external network;
a second network card connected to an internal network;
a stateful inspection firewall comprising a computing component having a memory for storing a stateful inspection table; and
a third network card,
wherein said firewall is connected to said first network card and said second network card, said firewall being adapted such that, during inflow of packets from the external network to the firewall, the first network card forwards each packet to the firewall, without use of said third network card, for inspection to determine whether or not the packet is part of an existing session by examining the stateful inspection table, and wherein:
(i) if the packet is part of an existing session the packet is forwarded via the data link layer to the second network card where the packet is forwarded on to the internal network, and
(ii) If the packet is not part of an existing session the packet is compared with a set of rules which determine whether the packet is acceptable or not acceptable to the network and wherein:
  (a) if the packet is acceptable the packet is forwarded via the data link layer to the second network card where the packet is forwarded to the internal network, and the session is entered into the stateful inspection table,
  (b) if the packet is not acceptable the packet will be dropped and will disappear,
and wherein during the outflow of packets from the internal network to the external network, an outbound packet passes through the second network card to the firewall, without use of said third network card, where the outbound packet is inspected to determine whether or not the outbound packet is part of an existing session and, if so, the outbound packet is forwarded to the first network card to exit the device to the external network, and, if not, the outbound packet is compared with the set of rules and if the packet is acceptable it is forwarded via the data link layer to the first network card to exit the device to the external network and, if not acceptable, the outbound packet is dropped and disappears,
and further wherein said third network card is provided as a management interface to said firewall for configuring said firewall.

14. A network bridge comprising:
a first network card connected to an external network without the use of an IP address;
a second network card connected to an internal network without the use of an IP address; and
a third network card having a private, not publicly routed IP address,
wherein said firewall is connected to said first network card and said second network card, said firewall being adapted such that, during inflow of packets from the external network to the firewall, the first network card forwards each packet to the firewall, without use of said third network card, for inspection to determine whether or not the packet is part of an existing session by examining the stateful inspection table, and wherein:
(i) if the packet is part of an existing session the packet is forwarded via the data link layer to the second network card where the packet is forwarded on to the internal network, and
(ii) If the packet is not part of an existing session the packet is compared with a set of rules which determine whether the packet is acceptable or not acceptable to the network and wherein:
  (a) if the packet is acceptable the packet is forwarded via the data link layer to the second network card where the packet is forwarded to the internal network, and the session is entered into the stateful inspection table,
  (b) if the packet is not acceptable the packet will be dropped and will disappear,
and wherein during the outflow of packets from the internal network to the external network, an outbound packet passes through the second network card to the firewall, without use of said third network card, where the outbound packet is inspected to determine whether or not the outbound packet is part of an existing session and, if so, the outbound packet is forwarded to the first network card to exit the device to the external network, and, if not, the outbound packet is compared with the set of rules and if the packet is acceptable it is forwarded via the data link layer to the first network card to exit the device to the external network and, if not acceptable, the outbound packet is dropped and disappears,
and further wherein said third network card is provided as a management interface to said firewall for configuring said firewall,
and wherein said firewall is adapted for generating a log which provides an indication of whether or not packets have been allowed or denied for storing in said memory.

* * * * *